JOHN E. WAITE.
Improvement in Transplanters.
No. 120,801. Patented Nov. 7, 1871.
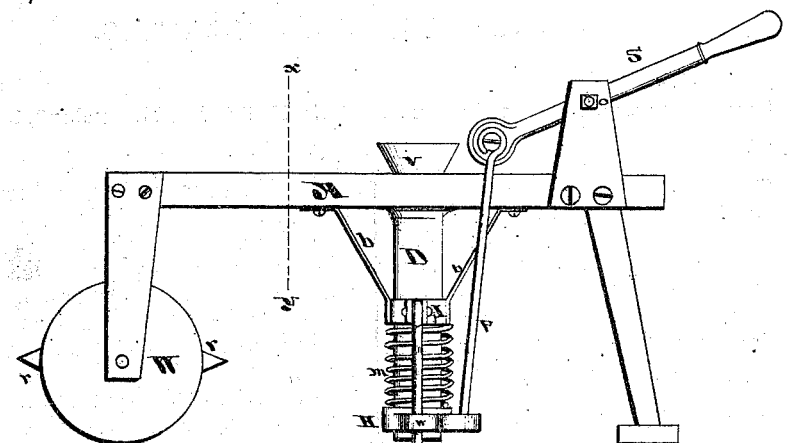
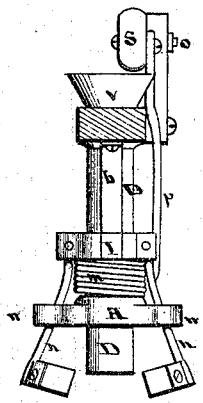
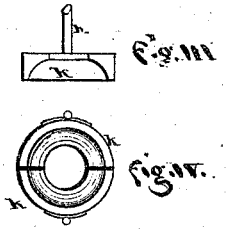
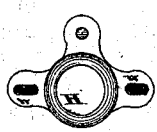

120,801

UNITED STATES PATENT OFFICE.

JOHN E. WAITE, OF HATFIELD, MASSACHUSETTS.

IMPROVEMENT IN TRANSPLANTERS.

Specification forming part of Letters Patent No. 120,801, dated November 7, 1871.

*To all whom it may concern:*

Be it known that I, JOHN E. WAITE, of Hatfield, Hampshire county, Commonwealth of Massachusetts, have invented an Improved Tobacco and Cabbage-Transplanter, of which the following is a specification.

My invention relates to the combination, with the frame or carriage, of a pipe set vertically through the frame and of sufficient diameter to admit a tobacco or cabbage-plant of the size usually set out, and guide it in its descent root foremost to the ground, beneath the lower end of the tube; and of the mechanism attached to the pipe for the purpose of crowding the earth around the roots when the root of the plant shall have entered the hole punched in the ground by the wheel in the frame preceding the pipe; the object of my invention being to enable cabbage, tobacco, and other plants to be set out with more regularity and speed, and without the laborious bending of the body attendant upon the ordinary method, and to also insure the plants being so set out that they will be in a position to be worked by cross-plowing without the necessity of the hills being laid off previous to their being planted.

In the drawing, Figure I is a side view of my invention. Fig. II is a partial cross-section at the line $xy$, and Figs. III, IV, and V are detail views of parts of my machine.

A is the frame, consisting of a cross-piece having a leg at the rear end, and supported at its forward end by the wheel W, proceeding through the cross-piece. At or near its center is the pipe D, provided with the funnel-shaped entrance V for the reception of the plants. The pipe is extended until its lower end is at or nearly on a line with the bottom of the leg and lower surface of wheel W, so that when the former is brought against the ground the end of the tube will be nearly in contact with the top surface of the hole for the plant, so that the leaves of the plant held in place by the pipe will give the direction to the root and sustain it until compressed by the earth being crowded around it. The pipe D is securely braced by the pieces $bb$, which also assist in holding fixed the collar I surrounding the pipe, and holding the hinges, upon which swing the followers $hh$, and affording a bearing for the coil-spring $m$, which surrounds the pipe also. The other end of spring $m$ rests upon the movable collar H, which travels up and down upon the pipe. The collar H is provided on each side with a wing, $w$, having a slot through which passes one of the followers, and is fastened to a rod, $p$, hinged at its upper end to the end of lever-handle S, hinged itself at $o$ to an upright from the frame A, so that the depression of lever-handle S causes the collar H to ascend upon the pipe and compress coil-spring $m$, while at the same time throwing out the followers $hh$, formed and hinged substantially as shown in Fig. II. Upon the end of each rod $hh$ is a piece, $k$, corresponding approximately in shape to the half of an inverted funnel. These pieces $kk$ swing out from the surface of the earth and away from the end of the pipe by the elevation of the collar H, so that when the lever-handle S is released the coil-spring, forcing down the collar H, causes the pieces $kk$ to come together again, compressing the earth between them and toward the center of the inverted funnel they form. Upon the front part of the frame is the wheel W, having upon its rim one or more spurs, $r$, of the size and length requisite to punch the hole deep and large enough for the roots of the plant. The frame is high enough to bring the funnel-shaped mouth of the pipe within easy reach of the operator without requiring him to bend the body.

The operation of my machine is as follows: The leg and rear end of the machine being lifted sufficiently from the ground to enable the pipe to clear it, the transplanter is wheeled forward upon ground previously harrowed or otherwise pulverized. The number of spurs $r$ and the size of perimeter of wheel W determine the distance apart of the plants. Upon the lower end of the pipe coming opposite the hole in the earth the rear end of the machine is lowered until the leg rests on the ground, and a plant is dropped into the pipe, the leaves of which guide the plant, root foremost, to the hole, which, when the plant has reached, the handle of the lever is released and the earth compressed around the plant to hold it, when the machine is again raised, and to leave it as well set out as it could be by hand.

Now, having described my invention, what I claim is—

1. In combination with the frame for holding them and affording a bearing for the lever-handle S, the pipe D, collars H and I, spring *m*, followers *h h*, pieces *k k*, forming in effect, when brought together, an inverted funnel, and the lever-handle S with its connecting-rod, the parts being constructed and arranged substantially as and for the purpose hereinbefore specified.

2. In combination with the above the wheel W, with one or more spurs *r*, as shown and described.

JOHN E. WAITE.

Witnesses:
R. F. HYDE,
L. L. PEASE.

(63)